(12) United States Patent
Gam

(10) Patent No.: US 8,079,934 B2
(45) Date of Patent: Dec. 20, 2011

(54) ENGINE STALL PREVENTION SYSTEM FOR INDUSTRIAL VEHICLES AND METHOD OF CONTROLLING THE SAME

(75) Inventor: Byung Woo Gam, Daegu (KR)

(73) Assignee: Daedong Industrial Co., Ltd., Daegu (KR)

( * ) Notice: Subject to any disclaimer, the term of this patent is extended or adjusted under 35 U.S.C. 154(b) by 861 days.

(21) Appl. No.: 12/137,534

(22) Filed: Jun. 11, 2008

(65) Prior Publication Data

US 2008/0305930 A1     Dec. 11, 2008

(30) Foreign Application Priority Data

Jun. 11, 2007    (KR) .................. 10-2007-0056785

(51) Int. Cl.
*B60W 10/00* (2006.01)
(52) U.S. Cl. ........................................... 477/94; 477/71
(58) Field of Classification Search ............... 477/40, 477/71, 73, 80, 91, 94
See application file for complete search history.

(56) References Cited

U.S. PATENT DOCUMENTS

| 6,314,801 | B1 * | 11/2001 | Reggiardo ............... 73/112.01 |
| 7,273,441 | B2 * | 9/2007 | Okabe et al. .................. 477/120 |
| 7,500,410 | B2 * | 3/2009 | Tsuji ................................ 74/325 |
| 2004/0140711 | A1 * | 7/2004 | Romeo ........................... 303/20 |

FOREIGN PATENT DOCUMENTS

| JP | 62-216842 A | 9/1987 |
| JP | 63-297131 A | 12/1988 |
| JP | 2001-090822 A | 4/2001 |
| KR | 1019990055631 A | 7/1999 |
| KR | 1020070034168 A | 3/2007 |

OTHER PUBLICATIONS

Japanese Office Action for Japanese Patent Application No. 2008-147898 which corresponds to U.S. Appl. No. 12/137,534.

* cited by examiner

*Primary Examiner* — Justin Holmes
(74) *Attorney, Agent, or Firm* — LRK Patent Law Firm

(57) ABSTRACT

Disclosed herein is an engine stall prevention system for industrial vehicles. The engine stall prevention system includes a transmission, which is configured such that a hydraulic shuttle valve for performing forward and reverse switching without requiring the operation of a clutch pedal, and a control unit for controlling the shuttle valve. The control unit receives a brake pedal operation signal from a brake detection unit for detecting the operation of a brake pedal, detects the traveling state of a vehicle using a traveling detection unit, determines whether the speed and engine RPM of the vehicle are equal to or less than respective preset values, and performs automatic control such that the shuttle valve enters a neutral state or a half-clutch state if it is determined that the vehicle speed is greater than the corresponding preset value and the engine RPM is equal to or less than the corresponding preset value.

3 Claims, 5 Drawing Sheets

[FIG. 1]
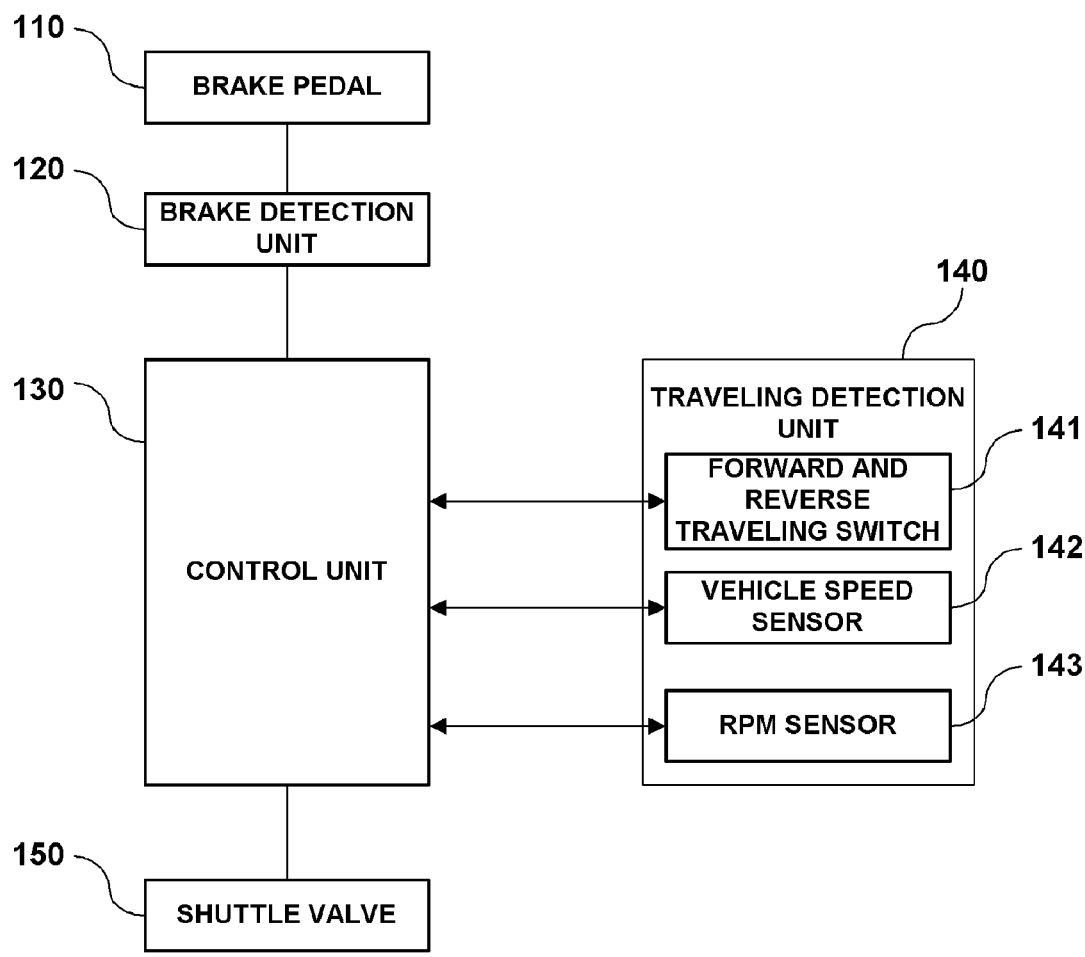

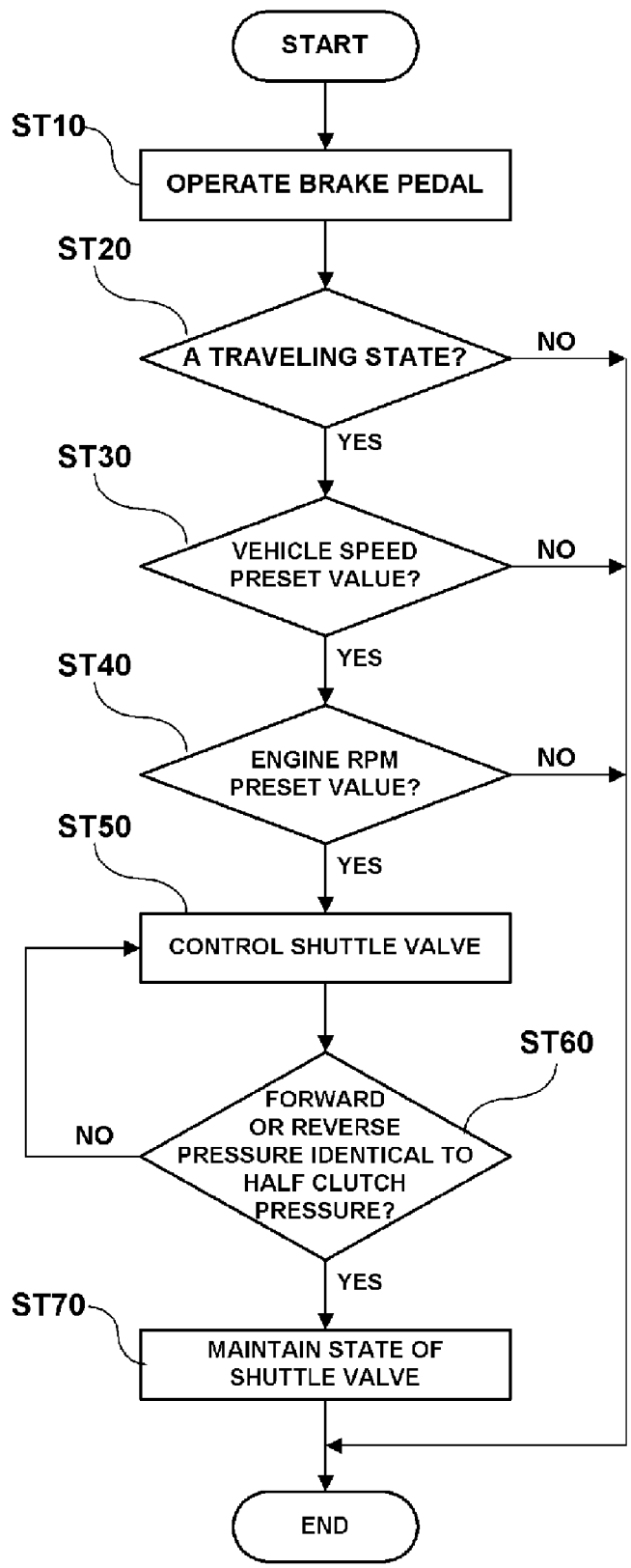
[FIG. 3]

ENGINE STALL PREVENTION SYSTEM FOR INDUSTRIAL VEHICLES AND METHOD OF CONTROLLING THE SAME

BACKGROUND OF THE INVENTION

1. Field of the Invention

The present invention relates generally to a transmission for industrial vehicles and, more particularly, to a system for preventing an engine from stalling when an industrial vehicle is braked, which is provided with a brake detection unit, detects the operation of the brake pedal of an industrial vehicle, which is traveling, using the brake detection unit, and causes a control unit, which operates in conjunction with the operation of a brake pedal, to determine whether the speed and engine Revolutions Per Minute (RPM) of the vehicle are equal to or less than respective preset values, and to automatically switch a shuttle valve to a neutral state or a half-clutch state, and a method of controlling the system.

2. Description of the Related Art

As generally known in the art, an industrial vehicle, such as an agricultural tractor, is configured such that a main transmission and a sub-transmission are integrally coupled in series in a transmission and, thus, a Power Take-Off (PTO) output is transmitted when the tractor is driven.

Here, the main transmission is configured such that gear trains, which are related to the forward and reverse traveling modes of the industrial vehicle, are arranged therein and is responsible for changes in speed, and the sub-transmission is responsible for increasing the range of speed for given speed stages provided by the main transmission. Here, a shuttle valve for performing the forward and reverse switching of the main transmission is mounted to the transmission.

Only when the transmission of power is interrupted by pressing a clutch pedal while pressing a brake pedal in order to stop the movement of a vehicle body during traveling, or when a shuttle valve enters a neutral state or a half-clutch state through the manipulation of the shuttle lever, does the engine of the above-described industrial vehicle maintain an idle state without stalling after braking.

However, the conventional industrial vehicle, described above, is problematic in that manipulation thereof is inconvenient because the transmission of power must be interrupted by simultaneously pressing both a clutch pedal and a brake pedal in order to stop the movement of a vehicle body during traveling, or because a shuttle valve must enter a neutral state or a half-clutch state through the manipulation of the shuttle lever. As a result, the case where beginner drivers, who are not proficient in the operation of such an industrial vehicle, accidentally stall the engine, occurs frequently.

Furthermore, in the case where the response of a driver is slow when braking is conducted, a problem occurs in that the braking distance is increased, and thus the risk of accidents is increased.

Furthermore, in the case where it is desired to stop a vehicle body when traveling on a slope, it becomes necessary for the driver to apply a large force when pressing the pedals using the feet, because both a clutch pedal and a brake pedal must be simultaneously pressed. This makes it difficult for the driver to manipulate the controls.

SUMMARY OF THE INVENTION

Accordingly, the present invention has been made keeping in mind the above problems occurring in the prior art, and the present invention is intended to provide a system for preventing an engine from stalling when an industrial vehicle is braked, which is provided with a brake detection unit, detects the operation of the brake pedal of an industrial vehicle, which is traveling, using the brake detection unit, and causes a control unit, which operates in conjunction with the operation of a brake pedal operation, to determine whether the speed and engine RPM of the vehicle are equal to or less than respective preset values and to automatically switch a shuttle valve to a neutral state or a half-clutch state, and a method of controlling the system.

The present invention provides an engine stall prevention system for industrial vehicles, each of the industrial vehicles including a transmission, which is configured such that a hydraulic shuttle valve for performing forward and reverse switching without requiring the operation of a clutch pedal is attached thereto, and a control unit for controlling the shuttle valve, wherein: the control unit receives a brake pedal operation signal from a brake detection unit for detecting the operation of a brake pedal, detects the traveling state of a vehicle using a traveling detection unit, determines whether the speed and engine RPM of the vehicle are equal to or less than respective preset values, and performs automatic control such that the shuttle valve enters a neutral state or a half-clutch state if it is determined that the vehicle speed is greater than the corresponding preset value and the engine RPM is equal to or less than the corresponding preset value, thus preventing the engine from stalling.

In addition, the present invention provides a method of controlling an engine stall prevention system for industrial vehicles, including: operating a brake pedal; determining whether a vehicle is entering a traveling state when the operation of the brake pedal is conducted; determining whether the speed of the vehicle is greater than a preset value if, as a result of the determination, it is determined that the vehicle has entered the traveling state; determining whether the engine RPM of the vehicle is equal to or less than a preset value if, as a result of the determination, it is determined that the vehicle speed is greater than the preset value; and performing control such that a shuttle valve enters a neutral state or a half-clutch state if, as a result of the determination, it is determined that the engine RPM is equal to or less than the preset value.

BRIEF DESCRIPTION OF THE DRAWINGS

The above and other objects, features and advantages of the present invention will be more clearly understood from the following detailed description taken in conjunction with the accompanying drawings, in which:

FIG. 1 is a schematic block diagram showing an engine stall prevention system for industrial vehicles according to the present invention;

FIG. 3 is a flowchart illustrating a method of controlling the engine stall prevention system, according to the present invention.

DESCRIPTION OF THE PREFERRED EMBODIMENTS

An engine stall prevention system for industrial vehicles according to an embodiment of the present invention is described in detail with reference to the accompanying drawings below.

Figure 2A:
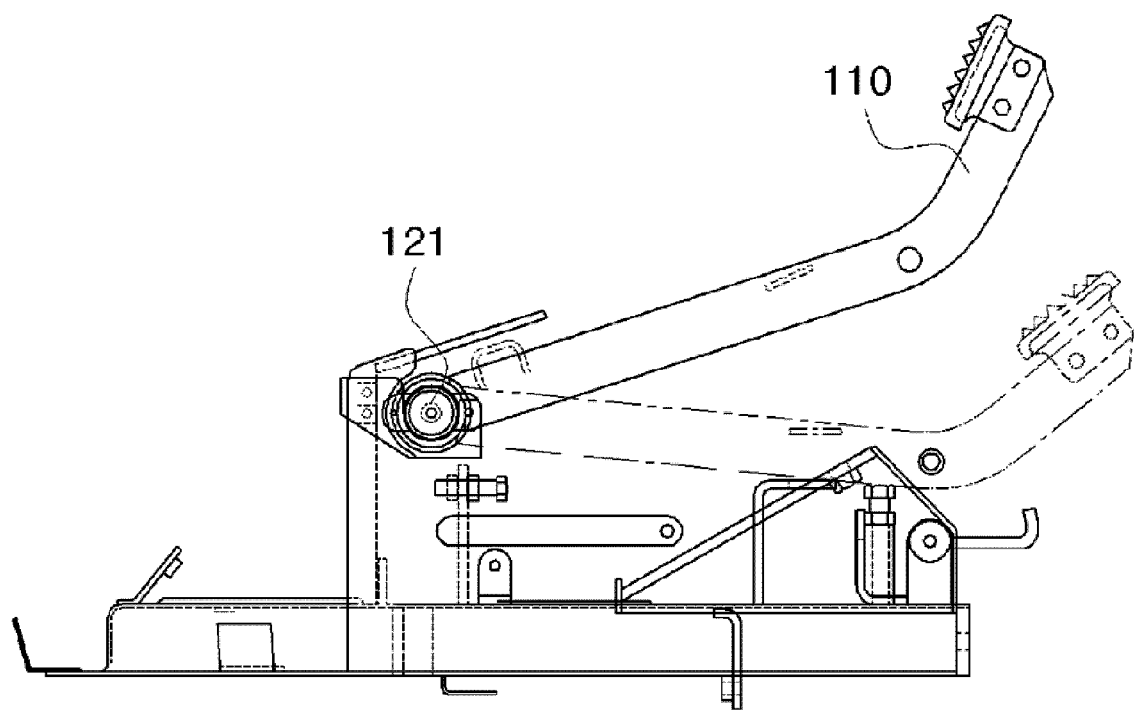
FIGS. 2A to 2C are diagrams illustrating embodiments of a brake operation detecting means according to the present invention.
Figure 2B:
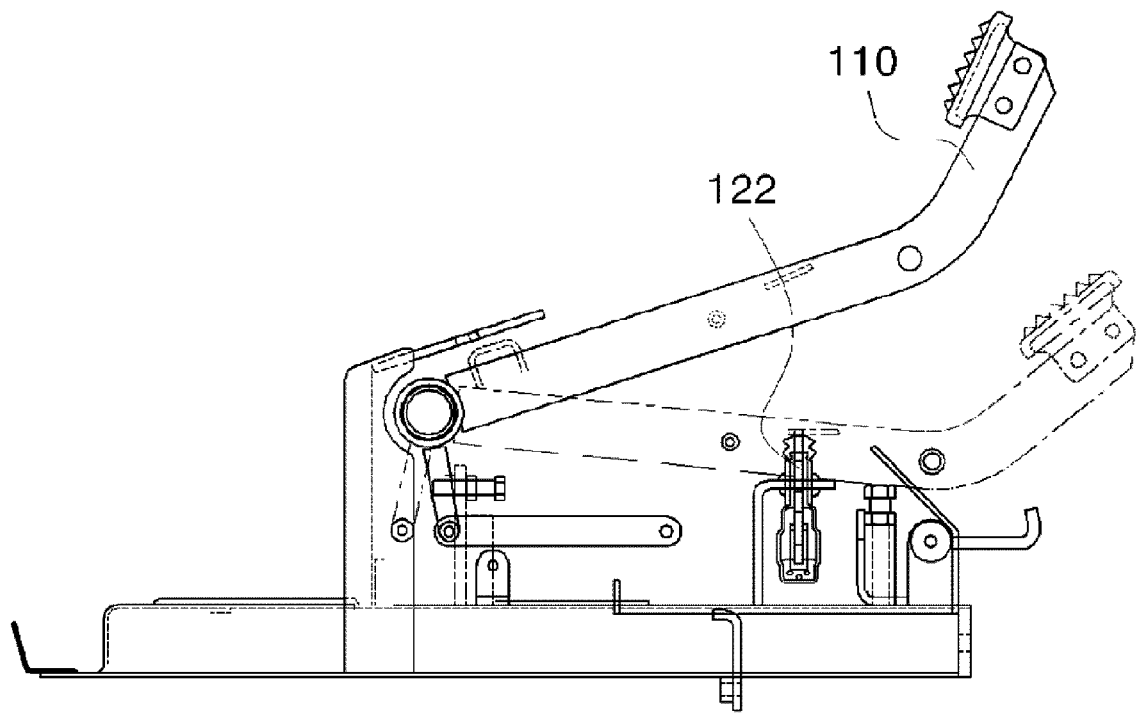
Figure 2C:
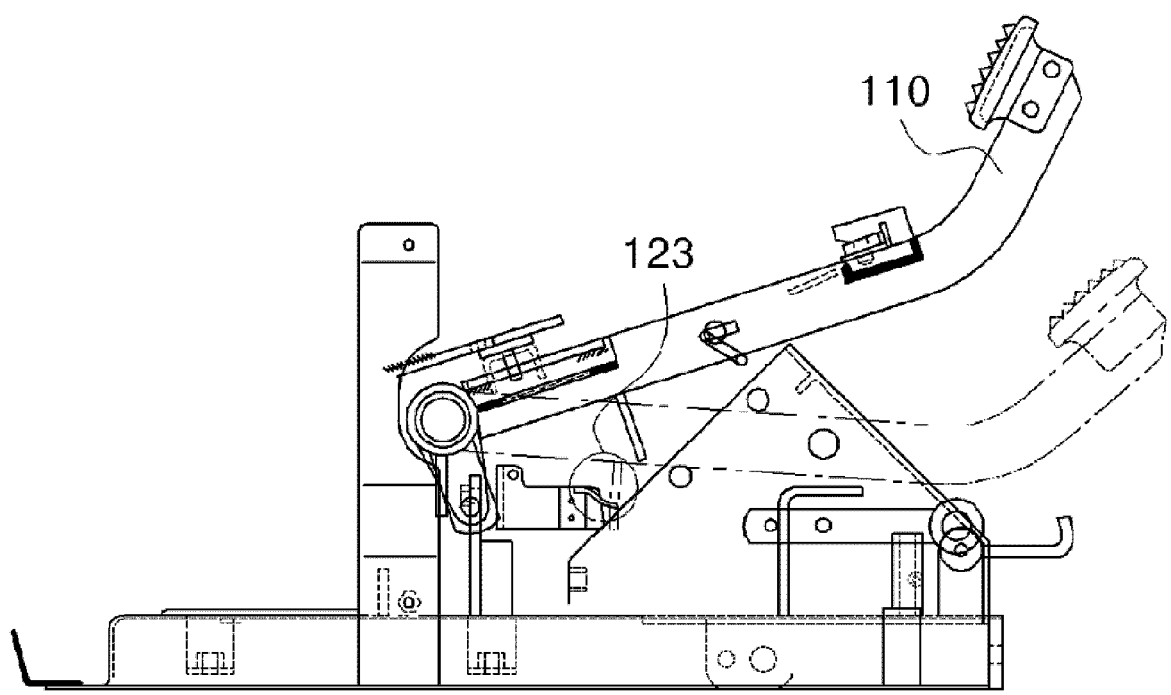

FIG. 1 is a schematic block diagram showing an engine stall prevention system for industrial vehicles according to the present invention, and FIGS. 2A to 2C are diagrams illustrating embodiments of a brake operation detecting means according to the present invention.

As shown in the drawings, the engine stall prevention system according to the present invention is applied to the transmission of an industrial vehicle. A hydraulic shuttle valve 150 for performing forward and reverse switching is attached to the above-described transmission without requiring the operation of a clutch pedal. A control unit 130 for controlling the shuttle valve 150 is mounted to the above-described transmission.

In this case, the control unit 130 operates in conjunction with a brake detection unit 120 for detecting the operation of a brake pedal 110. When the operation of the brake pedal 110 is detected, the control unit 130 functions to determine whether the speed and engine RPM of the vehicle are equal to or less than respective preset values and to automatically switch the shuttle valve 150 to a neutral state or a half-clutch state.

FIG. 2A is an embodiment of the brake detection unit 120 according to the present invention, and shows an example in which a potentiometer 121 is mounted to the rotational shaft of the brake pedal 110. As shown in FIG. 2A, the potentiometer 121 measures variable resistance, which is increased or decreased as the rotational angle of the brake pedal 110 varies, and detects the operation of the brake pedal.

FIG. 2B is another embodiment of the brake detection unit 120 according to the present invention, and shows a brake sensor 122, which is mounted below the brake pedal 110. The above-described brake sensor 122 may be operated in conjunction with brake lamps. In this case, the brightness of the brake lamps may be adjusted according to the extent to which the brake pedal 110 is pressed.

FIG. 2C is a further embodiment of the brake detection unit 120 according to the present invention, and shows respective contact terminals, which are mounted to the lower surface of the brake pedal 110 and to a predetermined location below the brake pedal 110, and a contact switch 123, which is used to detect the contact states of the contact terminals.

In addition, a pressure sensor (not shown), which is mounted on a brake line and is configured to directly detect a brake pressure, may be used as the brake detection unit 120.

A signal detected by the brake detection unit 120 is input to the control unit 130. The control unit 130 operates in conjunction with a traveling detection unit 140, and determines whether a vehicle is entering a traveling state. If it is determined that the vehicle has entered the traveling state, the control unit 130 determines whether the speed and engine RPM of the vehicle are equal to or less than respective preset values.

In this case, the traveling detection unit 140 includes a forward and reverse traveling switch 141 for detecting the travel (forward and reverse traveling) of a vehicle, a vehicle speed sensor 142 for detecting whether vehicle speed is equal to or less than a preset value, and an RPM sensor 143 for detecting whether the engine RPM of the vehicle is equal to or less than a preset value.

The control unit 130 compares signals, which are received from the traveling detection unit 140, with preset values, and determines whether the vehicle is entering a state immediately before an engine stalls through the operation of the brake pedal 110. If it is determined that the vehicle has entered the state immediately before an engine stalls, the control unit 130 causes the shuttle valve 150 to enter the neutral state or the half-clutch state. Accordingly, the engine can be prevented from stalling.

Here, the shuttle valve 150 may be configured to be supplied with working fluid having a predetermined pressure generated by a hydraulic pump using a hydraulic line, and to be operated by the supplied working fluid. In this case, a pressure sensor (not shown) for detecting the pressure of the working fluid is mounted to the hydraulic line, and continuous detection is performed to determine whether the shuttle valve 150 remains in the neutral state or the half-clutch state using such a pressure sensor. Detection signals, which are acquired through the above-described detection, are transmitted to the control unit 130, and thus the control unit 130 performs control such that the neutral state or the half-clutch state is maintained until before a braked state is released.

As described above, the present invention comprises the brake detection unit 120, which is used to detect the operation of a brake and is provided to the brake pedal 110, allows information about the operation of the brake pedal 110 by a driver to be provided to the control unit 130, causes the control unit 130, which has received signals generated by such operation, to determine whether the vehicle is entering a traveling state, whether the engine RPM of the vehicle is equal to or less than a preset value, and whether the speed of the vehicle is equal to or less than a preset value, in order to perform control such that the shuttle valve 150 enters the neutral state or the half-clutch state.

FIG. 3 is a flowchart illustrating a method of controlling the engine stall prevention system, according to the present invention.

The method of controlling the engine stall prevention system according to the present invention is described with reference to FIG. 3. As shown in FIG. 3, when a first step ST10 of a driver operating the brake pedal 110 is first performed, the brake detection unit 120 detects the operation of the brake pedal, and transmits a detection signal to the control unit 130.

Subsequently, a second step ST20 of the control unit 130 determining whether a vehicle is entering a traveling state (or a parked state) from the operation of the brake pedal 110, which is performed at the first step, using the forward and reverse traveling switch 141, is performed.

If, as a result of the determination of the second step, it is determined that the vehicle has entered the traveling state, a third step ST30 of the control unit 130 determining whether the traveling speed of the vehicle is greater than a preset value using the vehicle speed sensor 142 is performed.

In this case, if the vehicle is traveling downhill, the speed of the vehicle may be increased regardless of the engine RPM. For this reason, a fourth step ST40 of the control unit 130 determining whether the engine RPM of the vehicle is equal to or less than a preset value using the RPM sensor 143 is performed.

If, as a result of the determination of the fourth step, it is determined that the engine RPM is equal to or less than the preset value, a fifth step ST50 of the control unit 130 performing control that the shuttle valve 150 enters the neutral state or the half-clutch state is performed.

At the fifth step, the shuttle valve 150 may be operated using a hydraulic line (not shown). In this case, the control unit 130 performs control such that the neutral state or the half-clutch state is maintained until a braked state is released.

The fifth step may further include a sixth step ST60 of mounting a pressure sensor (not shown) to the hydraulic line and detecting the half-clutch state using the pressure sensor, and a seventh step ST70 of the control unit 130 performing control such that the shuttle valve 150 enters the neutral state or the half-clutch state in response to a pressure detection signal, which is acquired at the sixth step.

As described above, the present invention detects the operation of the brake pedal 110, which is conducted by a worker, and determines the traveling state of a vehicle, so that a problem in which an engine stalls at the time of emergency braking can be solved and, in addition, the inconvenience that occurs because both the clutch and brake of a vehicle must be simultaneously operated when braking is conducted while traveling on a slope can be eliminated, with the result that the present invention is advantageous in that it is not necessary to apply excessive force when pressing the pedals, and thus excellent vehicle operation can be achieved.

The present invention is provided with a brake detection unit, detects the operation of the brake pedal of a vehicle, which is traveling, using the brake detection unit, and causes a control unit to determine whether the speed and engine RPM of the vehicle are equal to or less than respective preset values and to automatically switch a shuttle valve to a neutral state or a half-clutch state, so that the present invention is convenient in that it is not necessary to press the clutch pedal when braking is conducted, therefore a problem in which an engine stalls in an emergency braking situation can be prevented, and, in addition, the braking distance can be reduced due to the rapid interruption of power.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An engine stall prevention system for industrial vehicles, each of the industrial vehicles comprising a transmission, which is configured such that a hydraulic shuttle valve for performing forward and reverse switching without requiring operation of a clutch pedal is attached thereto, and a control unit for controlling the shuttle valve, wherein the control unit receives a brake pedal operation signal from a brake detection unit for detecting operation of a brake pedal, detects a traveling state of a vehicle using a traveling detection unit, determines whether a speed of the vehicle and engine RPM of the vehicle are equal to or less than respective preset values, and performs automatic control such that the shuttle valve enters a neutral state or a half-clutch state, wherein a pressure sensor for detecting a pressure in a hydraulic line is mounted in order to detect whether the shuttle valve is entering the neutral state or the half-clutch state, and wherein the control unit performs control such that the half-clutch state is maintained during operation of the brake pedal.

2. The engine stall prevention system as set forth in claim 1, wherein the brake detection unit uses at least one of a potentiometer, which is mounted to a rotational shaft of the brake pedal and measures variable resistance, which is increased or decreased as a rotational angle of the brake pedal varies, a contact switch, which is configured to detect a contact state of the brake pedal, a brake sensor, which operates in conjunction with brake lamps, and a pressure sensor, which is mounted to a brake line and measures a pressure of working fluid.

3. The engine stall prevention system as set forth in claim 1, wherein the traveling detection unit comprises a forward and reverse traveling switch for detecting the traveling state (forward and reverse traveling state) of the vehicle, a vehicle speed sensor for detecting the traveling speed of the vehicle, and an RPM sensor for detecting the engine RPM of the vehicle, wherein measured signals are transmitted to the control unit, and the shuttle valve is controlled by the transmitted measured signals.

\* \* \* \* \*